US 6,697,208 B2

(12) United States Patent
Adams et al.

(10) Patent No.: US 6,697,208 B2
(45) Date of Patent: Feb. 24, 2004

(54) SYSTEM AND METHODS FOR USING OFFSET INFORMATION ON A DATA STORAGE MEDIUM

(75) Inventors: Chad Adams, Roy, UT (US); Eric Peters, Roy, UT (US); Dan Rochat, Ogden, UT (US); Robert Short, Niwot, CO (US); Mark Reimann, Layton, UT (US)

(73) Assignee: Iomega Corporation, San Diego, CA (US)

( * ) Notice: Subject to any disclaimer, the term of this patent is extended or adjusted under 35 U.S.C. 154(b) by 413 days.

(21) Appl. No.: 09/935,556

(22) Filed: Aug. 22, 2001

(65) Prior Publication Data

US 2003/0039052 A1 Feb. 27, 2003

(51) Int. Cl.$^7$ .............................................. G11B 21/02
(52) U.S. Cl. .............................. 360/75; 360/44; 360/48; 360/53; 360/77.03
(58) Field of Search ............................ 360/44, 48, 51, 360/53, 60, 75, 77.03, 77.08

(56) References Cited

U.S. PATENT DOCUMENTS

| | | | | |
|---|---|---|---|---|
| 5,392,351 A | * | 2/1995 | Hasebe et al. ................. 705/51 |
| 5,917,669 A | | 6/1999 | Johnson et al. ................. 360/53 |
| 6,108,156 A | * | 8/2000 | Lee et al. ....................... 360/75 |
| 6,118,603 A | | 9/2000 | Wilson et al. ................. 360/48 |
| 6,433,948 B1 | * | 8/2002 | Lee ............................... 360/75 |

OTHER PUBLICATIONS

Bostanjoglo, O. et al., "Laser-induced multiple phase transitions in Ge-Te films traced by time-resolved TEM", *Applied Surface Science*, Elsevier Science Publishers, pp. 136–141, 1989.

Chen, M. et al., "Progress of Erasable Phase-Change Materials", *SPIE vol. 1078—Optical Data Storage Topical Meeting*, pp. 150–156, 1989.

Terao, M. et al., "Progress of Phase-Change Single-Beam Overwrite Technology", *SPIE vol. 1078—Optical Data Storage Topical Meeting*, pp. 2–10, 1989.

U.S. patent application Ser. No. 09/061,493, Kupka et al., filed Apr. 17, 1998.

U.S. patent application Ser. No. 09/191,666, Kupka et al., filed Nov. 13, 1998.

U.S. patent application Ser. No. 09/191,689, Kupka et al., filed Nov. 13, 1998.

U.S. patent application Ser. No. 09/191,976, Kupka et al., filed Nov. 13, 1998.

U.S. patent application Ser. No. 09/613,936, Kupka et al., filed Jul. 11, 2000.

U.S. patent application Ser. No. 09/891,441, Kupka et al., filed Jun. 25, 2001.

\* cited by examiner

*Primary Examiner*—David Hudspeth
*Assistant Examiner*—Jason Olson
(74) *Attorney, Agent, or Firm*—Woodcock Washburn LLP

(57) ABSTRACT

A system and methods for providing offset information on a storage medium are provided by writing at least one unalterable mark on the storage medium during a manufacturing formatting process. The unalterable mark(s) are variably offset from a fixed position. The amount of offset represents a first source of unique information. The unalterable mark(s) themselves comprise a second source of information. Both sources of information are combinable and may be utilized in connection with the generation of a unique serial number for the storage medium or for other digital rights management purposes.

23 Claims, 7 Drawing Sheets

SYSTEM AND METHODS FOR USING OFFSET INFORMATION ON A DATA STORAGE MEDIUM

CROSS-REFERENCE TO RELATED APPLICATION

This patent application is related to commonly assigned copending U.S. patent application Ser. No. 09/891,441, filed Jun. 25, 2001, entitled "Method and System for Providing Secure Digital Music Duplication."

FIELD OF THE INVENTION

The present invention relates to a format and formatting process for data storage media, and more particularly to a method for using offset information on a data storage medium e.g., to provide unique identification information.

BACKGROUND OF THE INVENTION

The Internet and many other sources now provide a vast array of streaming and fixed media content for listening and/or viewing. However, currently there is no practical way of capturing or recording the audio and/or video portion of the streaming or fixed media in a copy-protected manner so that a user can listen to or view the presentation at a later time, but also so that the user cannot freely copy and distribute the recorded material. This problem has existed in connection with other media rendering and recording devices e.g., VCRs for television content, or tape recorders for audio signals, but with at least one key difference. Since digital media content can be recorded with virtually no signal loss, this poses a "risk" for copyright owners that their works will be freely shared (pirated) without compensation. With VCRs and tape recorders, the device(s) and transmission media invite noise or corruption of data into the recording process. With streaming or fixed digital media, there is no reason why virtually lossless conversions and re-transmissions cannot be effected, at least to the limits of human ear capabilities, and there is no reason why unadulterated digital data cannot be stored and freely distributed. Thus, it would be desirable to prevent unfettered re-distribution of digital data because there is little difference between what copyright owners can provide for a fee and what one's friends, randomly located servers or even anonymous client devices, e.g., in the case of peer to peer networks like NAPSTER® and GNUTELLA®, can provide for free. Thus, with respect to streaming content, there is currently no practical way for the recorded data to be stored "securely" on a user's computer and also locked to that computer or storage medium with certain rights applied, otherwise known as Digital Rights Management (DRM).

DRM has thus received a lot of attention as a result of the ease with which digital data can be re-distributed ad infinitum without corruption. DRM systems have thus attempted to implement methods for encrypting music and applying certain digital rights to that piece of media with the express intent that you can not copy it, re-distribute it, or play the file without the right from the copyright holder to do so. For example, one system has a unique electronic serial number assigned to each disk. This serial number can be and is used as a key to secure and unlock digital music with its associated rights. For example, a particular digital sound file can be secured using the serial number on a portable disk for a portable disk player, so that the song can only be played when that disk is inserted into the system thus preventing re-distribution of the song. For example, commonly assigned copending U.S. patent application Ser. No. 09/891, 441 and related copending patent applications by the assignee of the present application describe the utilization of a medium's serial number in connection with a DRM licensing scheme in order to tie content to a particular medium, and the concomitant mass production of such media.

Storage media, and in particular re-writeable storage media, are at times shipped from a storage media manufacturer/distributor with pre-determined data already stored thereon. This includes not only unalterable structures on the media such as servo marks and sync fields, but also, for example, data packaged on the media that may be tied to the serial number of the disk. Such pre-packaged data may include one or more software programs, one or more data structures, one or more data files, and/or the like. Likewise, the re-writeable storage media may be a magnetic or optical in nature, and may be a tape, a disk, or the like. Moreover, the storage media may be read-only, write-only, read-write, or the like, as appropriate.

Once the storage media is shipped with the already-stored data, though, such storage media is quite obviously out of the hands of the manufacturer/distributor, who is then powerless to prevent anyone from making changes to the stored data on the storage media. Thus, at the front end of the storage medium manufacturing and formatting, it would be beneficial to provide robust and unalterable unique information for possible use in connection with a storage medium's serial number, and for further possible use in connection with a DRM licensing technique. It would be further desirable to leverage existing manufacturing and formatting infrastructure to create such robust and unalterable unique information. Thus, there is a need in the art for the provision of unalterable information on a medium that may nonetheless be flexibly altered upon creation in order to contain unique information relative to other media formatted according to the same process.

In this regard, media that store data along tracks have required methods for keeping a tracking head aligned with the center of a track, so that errors in reading and writing data do not occur. One traditional method is to provide marks, such as servo fields, on the storage medium in order to guide an actuator head by way of feedback from the marks. Thus, various techniques have been developed for writing/positioning servo marks on a recording medium for such purpose, and in various patterns. It would thus be desirable to leverage existing infrastructure for writing servo fields at formatting time for the purpose of providing unique information on a storage medium. It would be further desirable to create unique servo fields with graycodes that contain unique information, different from information contained in a servo field. It would be still further desirable to provide a variable offset in connection with the unique graycodes, whereby the information represented by the variable offset is combinable with the information embodied by the unique graycodes to form a flexible, unalterable, and unique number that may be retrieved by the electronics of a data storage device and/or form a basis for the serial number of the data storage medium.

SUMMARY OF THE INVENTION

The present invention provides a technique for providing offset information on a storage medium by providing at least one unalterable mark on the storage medium during a manufacturing formatting process. The unalterable mark(s) are variably offset from a fixed position. The amount of offset represents a first source of unique information. The unalterable mark(s) themselves comprise a second source of information. Both sources of information are combinable and may be utilized in connection with the generation of a unique serial number for the storage medium. Such unique information may also be incorporated into a digital rights management system.

Other features of the present invention are described below.

BRIEF DESCRIPTION OF THE DRAWINGS

The system and methods for offsetting information on a data storage medium are further described with reference to the accompanying drawings in which.

DETAILED DESCRIPTION OF THE INVENTION

Overview

The present invention provides variably offset marks having information on a recording medium at manufacturing format time to provide unique information readable, but not writeable, by read/write electronics of a data storage device. The mark's information content, or value represented by the mark's graycode, may be a first source of unique information. The amount of offset of the mark from at least one hard index may be a second source of unique information. The two sources of information may be combined in order to form a greater range of unique information than the individual sources. The unique information may be read by the read/write electronics of a data storage device, and utilized in connection with a serial number of the storage medium.

Exemplary Data Storage Device

Figure 1:
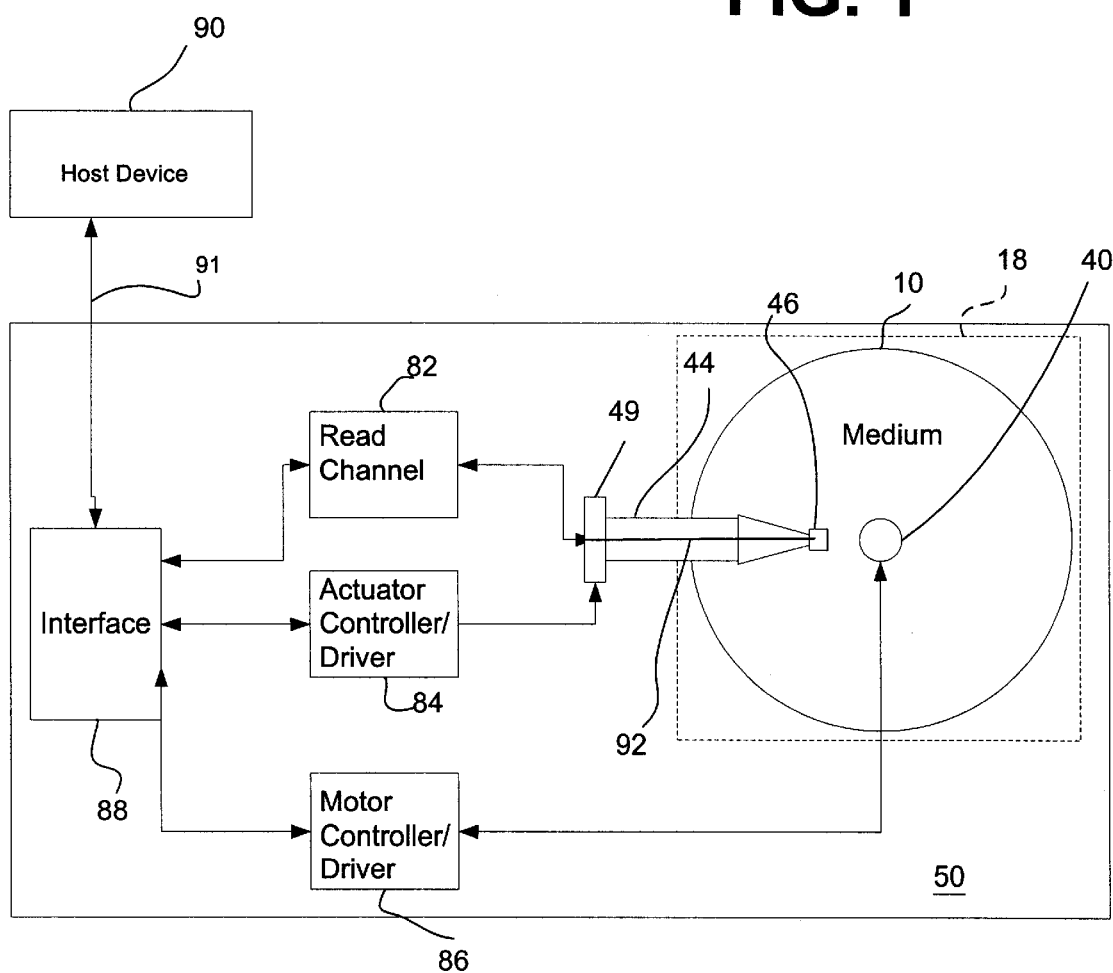
FIG. 1 illustrates an exemplary data storage device and host in connection with which a storage medium formatted according to the present invention may operate.

FIG. 1 is a schematic diagram of a storage drive for storing and retrieving information for a host device wherein a medium formatted according to the present invention may be employed. Host device 90 may be one of a number of various types of computer based devices such as a personal computer, a handheld computer, or the like. Host device 90 communicates with data storage device 50 via bus 91 by sending commands to write or read digital information to or from digital recording medium 10. Bus 90 may be any one of the various buses such as parallel, generic serial, USB, fire wire, SCSI, and so on.

Digital recording medium 10 may be one of any of the various digital data storage media such as magnetic, optical, or magneto-optical. Optionally, medium 10 may be fixed in the data storage device 50, or alternatively removable from data storage device 50. Where the medium 10 is removable from data storage device 50, medium 10 may be encased in an outer shell 18 to protect medium 10 from damage.

Data storage device 50 comprises a controller 88 that provides an interface with host device 90 as well as controlling the overall operation of data storage device 50. Controller 88 is preferably a microprocessor-based controller. Data storage device 50 also comprises a read channel 82 for conditioning signals read from medium 10; actuator controller 84 for providing servo control and tracking; motor controller 86 for controlling the spin rate of medium 10 via a spindle motor 40, and an actuator assembly for reading the data from medium 10.

The actuator assembly comprises a read/write head 46 that is connected to a distal end of an actuator assembly. Read/write head 46 comprises a slider that carries a read/write element, either formed therein or attached thereto. The actuator assembly also comprises a suspension arm 44 and an actuator 49 that cooperate to move the slider 46 over the surface of medium 10 for reading and writing digital information. The read/write element of head 46 is electrically coupled to read channel 82 by way of electrical conductor 92.

Exemplary Computing and Network Environments

A host 90, such as described in connection with FIG. 1, or other client device can be deployed as part of a computer network. Many DRM techniques involve the retrieval or transmission of data across a network, and thus the unique information of the present invention may ultimately be transmitted to another computing device. Thus, the present invention pertains to any computer system having any number of memory or storage units, and any number of applications and processes occurring across any number of storage units or volumes, wherein a host device 90 has access to a data storage device 50 for interacting with a medium 10, as formatted in accordance with the present invention. The present invention may thus apply to an environment with server computers and client computers deployed in a network environment, having remote or local storage.

Figure 2:
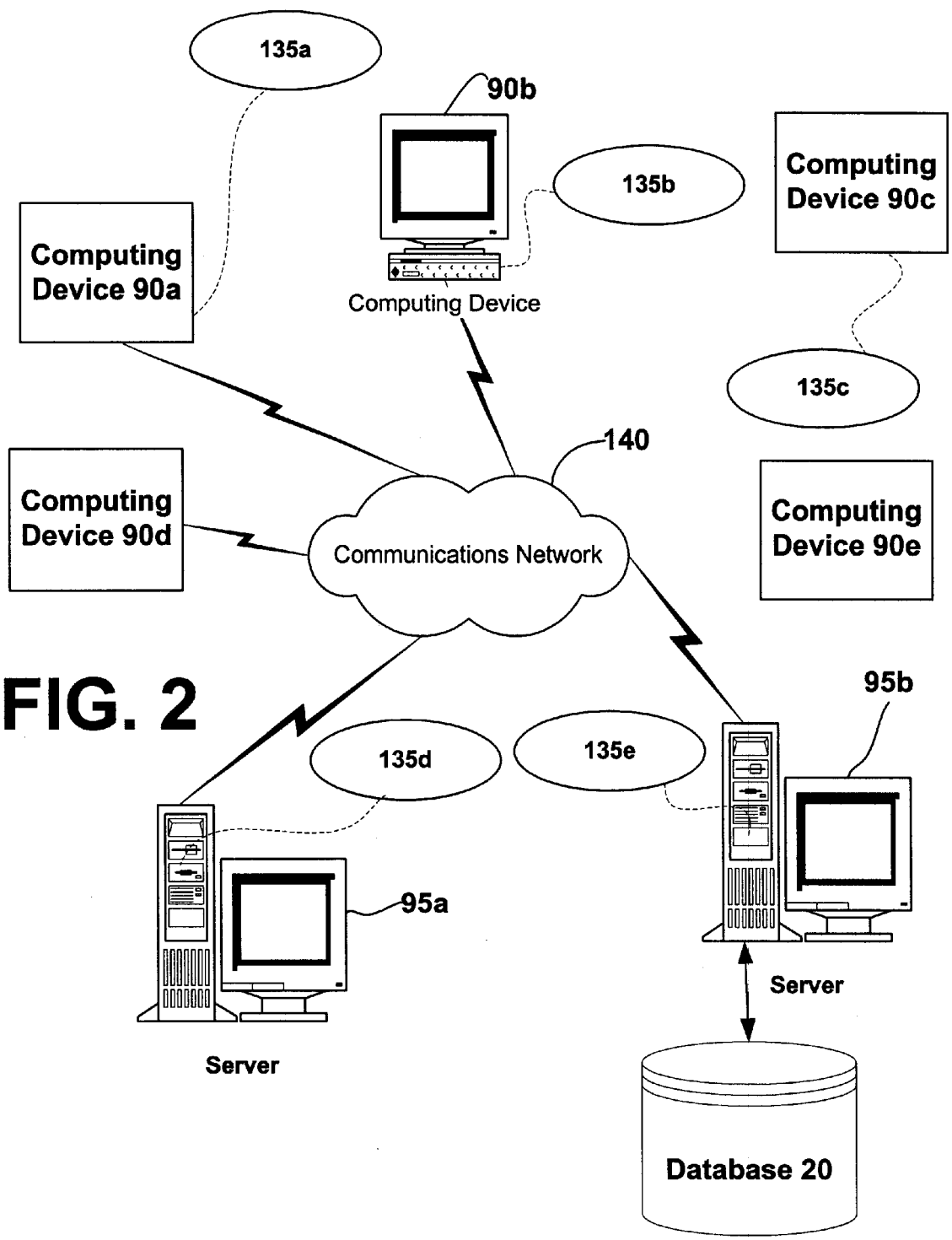
FIG. 2 illustrates an exemplary computer network environment in which a host computer may operate in accordance with the present invention.

FIG. 2 illustrates such an exemplary network environment, with a server in communication with client computers via a network, in which the present invention may be employed. As shown, a number of servers 95a, 95b, etc., are interconnected via a communications network 140 (which may be a LAN, WAN, intranet or the Internet) with a number of client or remote computing devices 90a, 9b, 90c, 90d, 90e, etc., such as a portable computer, handheld computer, thin client, networked appliance, or other devices, such as a VCR, TV and the like in accordance with the present invention. In a network environment in which the communications network 140 is the Internet, for example, the servers 95 can be Web servers with which the clients 90a, 90b, 90c, 90d, 90e, etc. communicate via any of a number of known protocols such as hypertext transfer protocol (HTTP). Communications may be wired or wireless, where appropriate. Client devices 90 may or may not communicate via communications network 140, and may have independent communications associated therewith. For example, in the case of a TV or VCR, there may or may not be a networked aspect to the control thereof.

Each client computer 90 and server computer 95 may be equipped with various application program modules 135, and with connections or access to various types of storage elements or objects, across which files, video and/or audio may be stored or to which portion(s) of files may be downloaded or migrated. Any server 95a, 95b, etc. may be responsible for the maintenance and updating of a database 20 in accordance with the present invention, such as a database 20 for storing content. Thus, the software of the present invention can be utilized in a computer network environment having client computers 90a, 90b, etc. for accessing and interacting with a computer network 140 and server computers 95a, 95b, etc. for interacting with client computers 90a, 90b, etc. and other devices and databases 20. Thus, when a medium 10 formatted according to the present invention is brought into a storage device 50 that communicates with a host 90 in such an exemplary computing environment, such host computer(s) may communicate with various other client computers 90 and servers 95 via the communications network 140, or other wired and/or wireless means.

Offsetting Information on a Data Storage Medium to Create a Unique Identifier

The present invention provides marks, at a variable offset, on a storage medium that are unalterable by a read/write operation of a data storage device, wherein the amount of offset and value of the mark provide a source of unique information. The present invention thus allows for a large number of unique disks to be created, based on the combination of some data and the placement of that data, done in an area of the disk that is unalterable by the user or read/write electronics of a data storage device.

Figure 3:
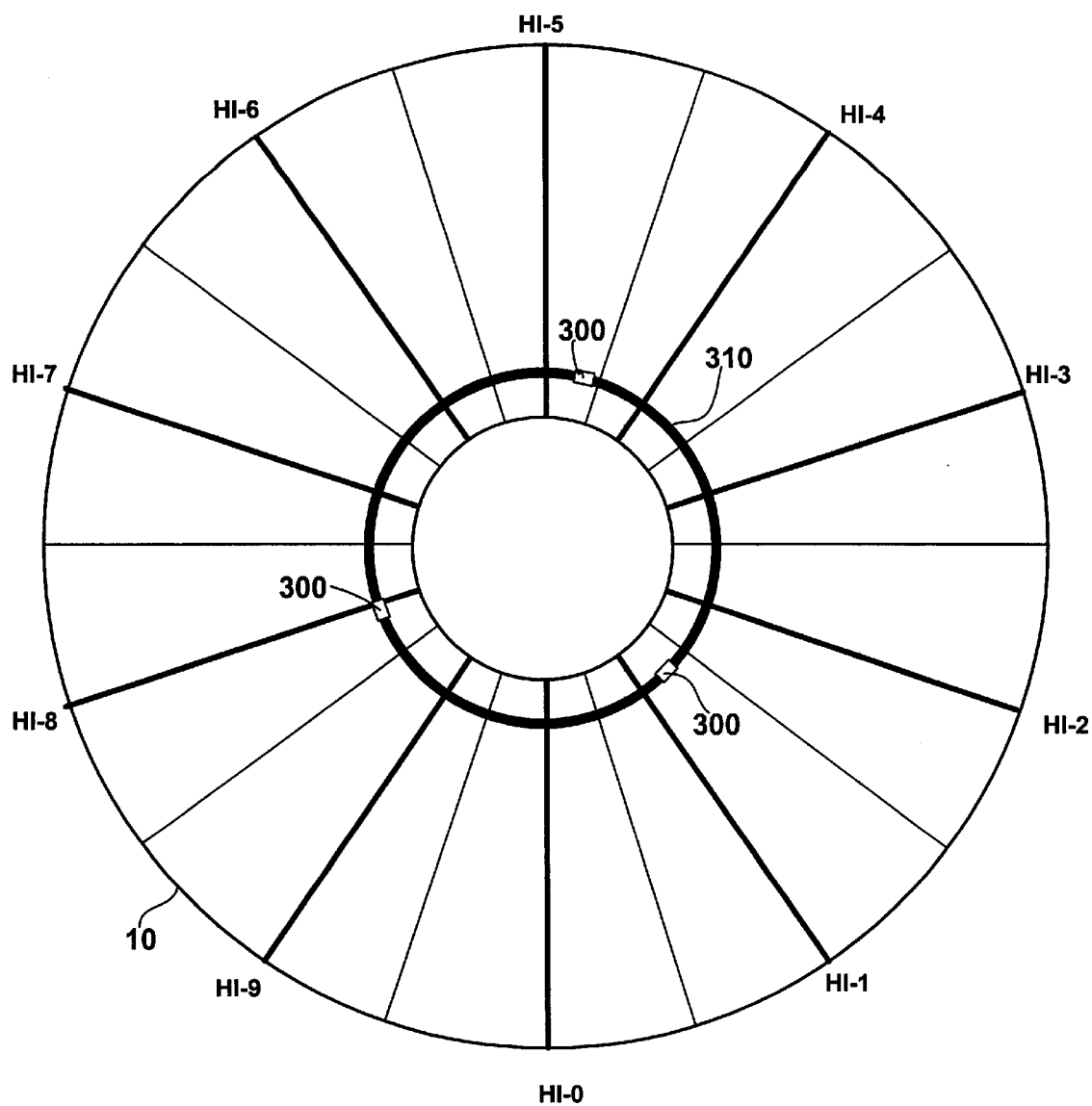
FIG. 3 illustrates an exemplary implementation of the provision of offset information in accordance with the present invention.

As one of ordinary skill in the art can appreciate, the servowriting process for a magnetic type storage medium creates servo fields that have graycode fields. For example, a servowriting process might write 120 servo fields all around a single track for the purpose of guiding an actuator head. With the present invention, in connection with (before, during or after) the writing of the 120 servo fields, the servowriter creates a hard index or a series of hard indices. These comprise writing the data of some of the servo wedges differently to indicate a hard index. As shown in FIG. 3, an exemplary configuration of hard indices is shown position around the storage medium 10 as hard indices HI-0 through HI-9. While 10 hard indices are shown, at least one hard index suffices in accordance with the present invention. Also, hard indices may be written over the entire surface of the disk, as shown. Then, a special graycode 300 would be written at an offset from the first hard index HI-0. In an exemplary non-limiting embodiment, the offset may be any one of 32 offset locations, although any number of offset locations could be accommodated depending upon the range of uniqueness desired. In another non-limiting aspect of the depicted embodiment, this special Graycode 300 comprises 12 bits of data, which may be a random number generated by the servo writing process. The Graycode 300 may be repeated X times over the track as well, at offsets of 1/X of the track circumference for redundancy and robustness. In the example shown, the Graycode 300 is repeated three times over the track as well, at offsets of ⅓ of the track circumference. Graycode(s) 300 may be written on a graycode track 310.

The amount of the offset Graycode 300 and the 12 bits of the Graycode 300 may be retrieved by an appropriate software command from the data storage device, such as a Get OG Command( ), resulting in a 17-bit value for the example shown, although any number of bits is possible based upon a combination of the amount of offset and the value of the graycode 300. For DRM purposes, this 17-bit value is fairly unique to the storage medium 10 (1 in 131,072 possibilities) and can be used in things such as the media serial number or other methods of DRM. The special Graycode value and its offset cannot be changed by a user's data storage device, since the data storage device writes at a different frequency than the servowriter and is therefore unable to change the special information represented by the offset graycode 300.

Figure 4:
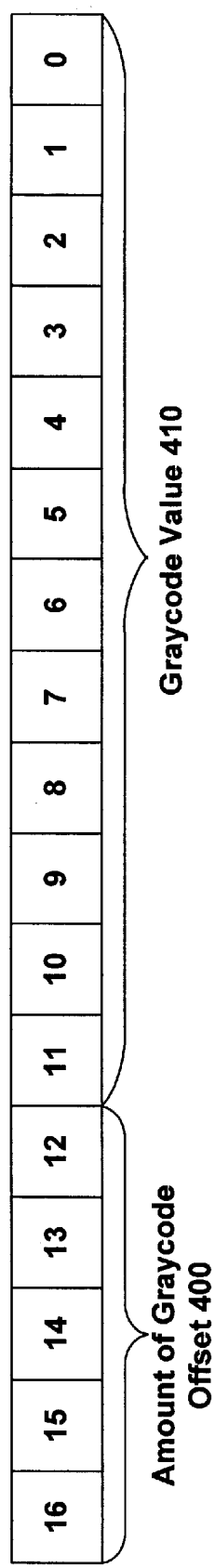
FIG. 4 illustrates an exemplary combination of offset and mark information in accordance with the present invention.

FIG. 4 illustrates an exemplary combination of the value information and the amount of offset to form a unique number in accordance with the present invention. As shown in the non-limiting embodiment, the amount of the graycode offset 400, represented by 5 bits for a range of 32 values, and the graycode value 410, represented by 12 bits for a range of 4096 values, are concatenated to form a 17 bit value for a range of unique 131,072 values. Methods of combining the amount of offset 400 and graycode value 410 are not limited to concatenation in accordance with the invention, but rather splicing, converting the values through a function f(amount of offset, graycode value), permutations and combinations thereof of offset 400 and value 410 are considered to be included when making reference to combining the values.

Further Non-Limiting Embodiments of the Invention

Figure 5A:
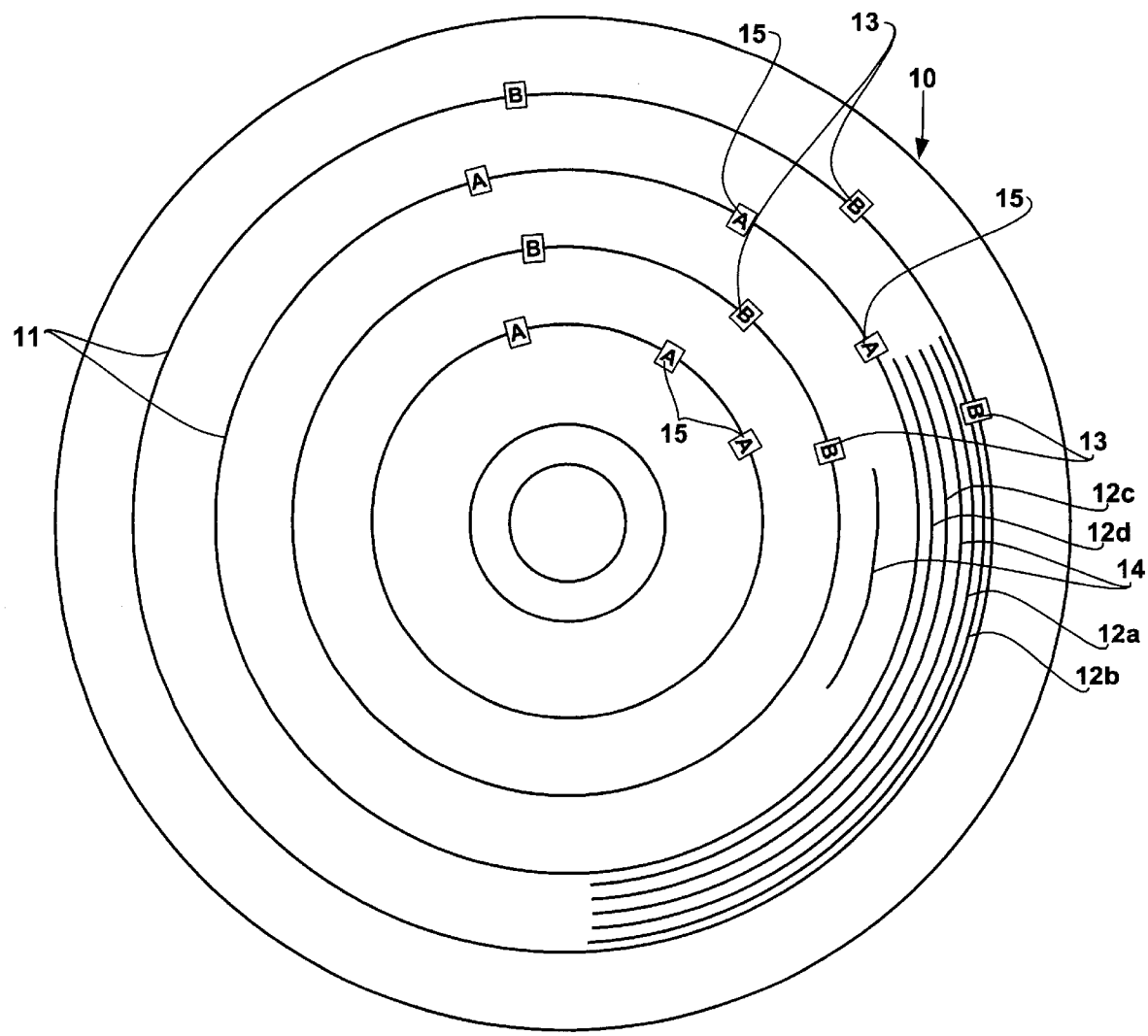
FIG. 5A represents a top view of a first kind of formatted medium that may accommodate the present invention.

The invention may apply to any format of a recording medium. In accordance with the above-described embodiment, a servowriting process leverages the servo field writing process for a magnetic storage medium. One traditional method is to provide servo marks, such as servo fields, on the storage medium in order to guide an actuator head by way of feedback from the marks. Thus, various techniques have been developed for writing/positioning servo marks on a recording medium for such purpose, and in various patterns. FIGS. 5A and 5C illustrate that any format of the recording medium is possible, and that all such differently formatted recording mediums may utilize the offset graycode technique of the present invention for providing unique information.

FIG. 5A illustrates an exemplary recording medium 10 having servo fields 13 and 15. Recording medium 10 has data tracks 14 positioned radially from the center of medium 10. As can be appreciated by one of ordinary skill in the art, a variety of configurations for servo fields are possible in connection with a medium 10, and is considered a design choice recognizable by the firmware of the drive electronics. In an exemplary configuration, servo fields 15 are positioned on one side of data tracks 14 and servo fields 13 are positioned on the other side of data tracks 14. Servo fields 13 and servo fields 15 are generally positioned along concentric circles 11.

Figure 5B:
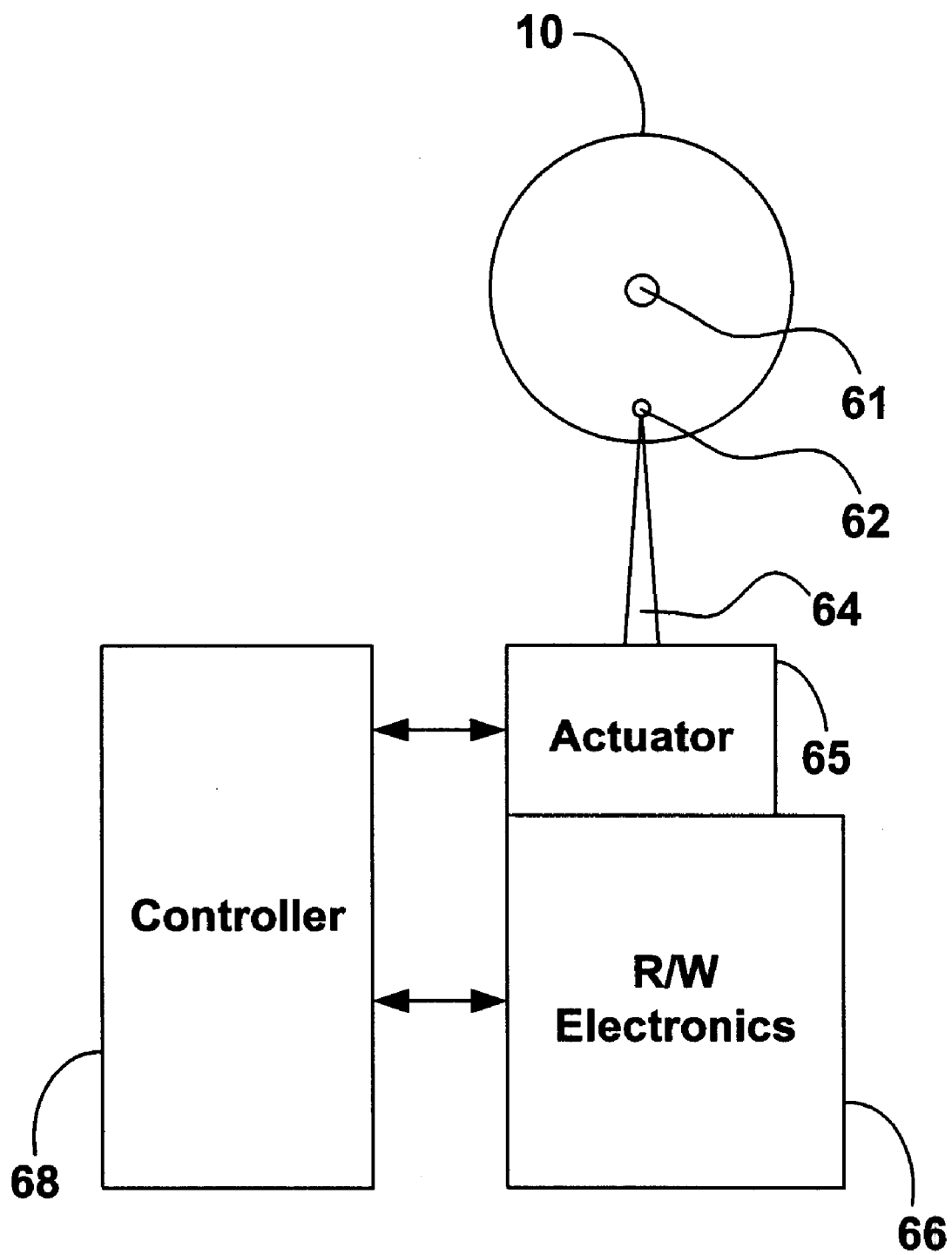
FIG. 5B represents a block diagram of the operation of exemplary tracking on a medium with servo fields.
Figure 5C:
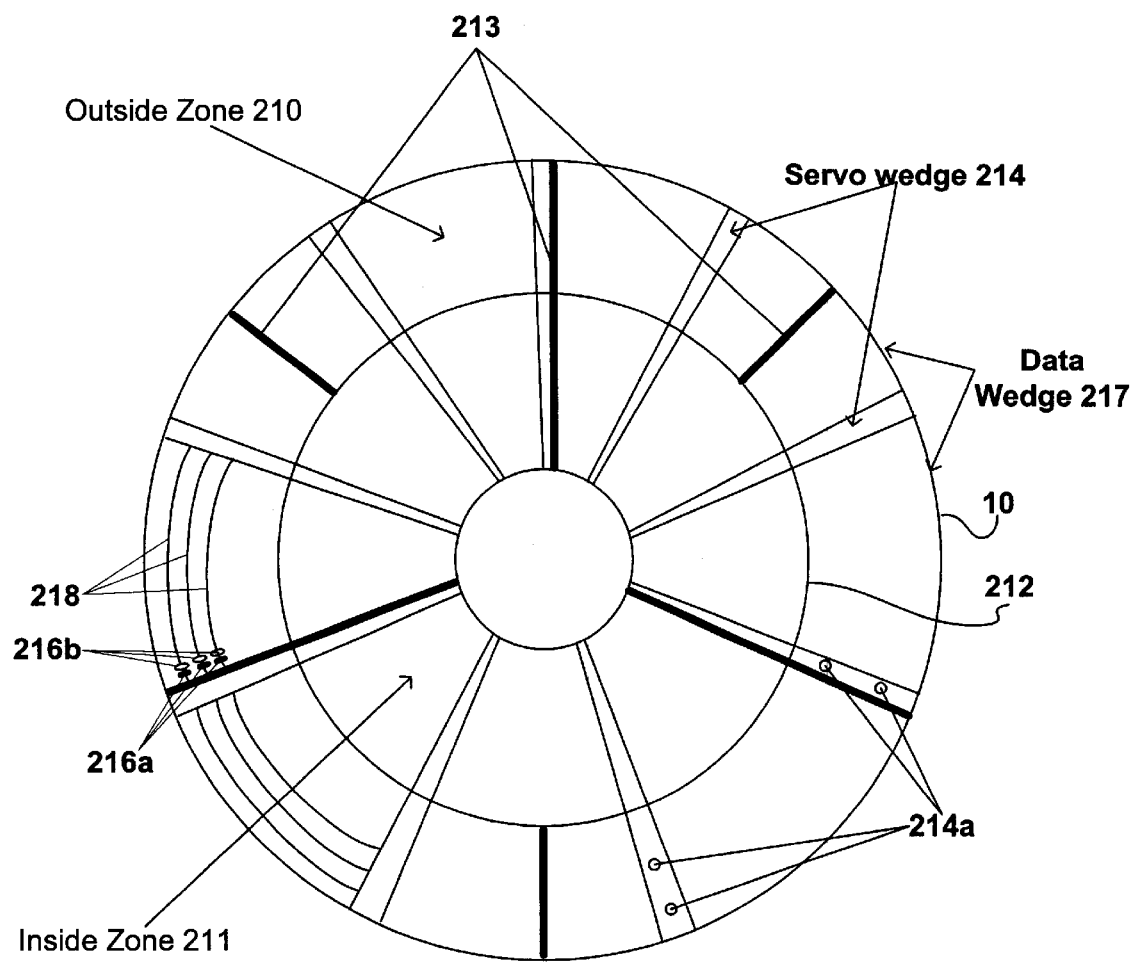
FIG. 5C represents a top view of a second kind of formatted medium that may accommodate the present invention.

With additional reference to FIG. 5B, exemplary operation of a tracking system for tracking data tracks 14 using servo fields is illustrated. A head 62 having an arm 64 can be moved generally radially inward or outward relative to optical disk 10 having center 61 by an actuator 65. Information from the head 62 is sent to read/write electronic circuitry 66 or information can be sent from read/write electronic circuitry 66 to head 62. Information regarding the position of the head can also be communicated from the read/write electronic circuitry 66 to controller 68. Controller 68 also communicates to read/write electronic circuitry 66 information such as whether to read or write and other data incident thereto. Controller 68 also sends a signal to actuator 65 with information about where to move the head 62 having processed the information read from the servo fields. Actuator 65 sends feedback to controller 68 concerning the relative amount of movement completed. These are some main signal components that allow the system to operate in a feedback loop.

For example, when medium 10 spins on center 61, head 62 begins reading data along a data track 14. If, however, the head begins to move towards deviation line 12a, which movement can take place for a variety of reasons, such as may be attributed to eccentricity and elliptical distortion, errors in data reading may begin to occur. Accordingly, when the head passes over servo mark 13, an information signal is conveyed via read/write electronics 66 to the controller 68 to move the head back to center line 14 via actuator 65. If the head 62 moves as far as deviation line 12b, the probability of an error in reading data increases even more, and more surface area of servo mark 13 is passed over by optical head 62. When the head 62 passes over servo mark 13, an information signal reflecting the surface area passed over is conveyed to the controller 68 via read/write electronics 66. In accordance with this information signal, the controller 68 sends a signal to actuator 64 to move the head 62 back to center line 14.

This same procedure can be used when the head drifts in the other direction towards servo fields 15. If optical head 62 travels along path 12c, the optical head 62 will pass over servo mark 15. The optical head 62 will receive information corresponding to servo mark 15 and will transmit a signal via read/write electronics 66 to controller 68. Controller 68 processes the signal and outputs the amount of movement actuator 65 needs to move optical head 62 to return to data path 14. In a like fashion, if the optical head 62 drifts as far as path 12d, more surface area of servo mark 15 is passed over by the optical head 62, and accordingly read/write electronics 66 read a signal corresponding to the greater amount of surface area of servo mark 15 passed over. Read/Write electronics 66 convey this signal to controller 68, which processes the signal and sends a signal to actuator 65 indicative of the distance optical head 62 needs to move to return to data path 14. Servo fields 13 and 15 contain different information in order to differentiate between the two directions of head drift that can occur, so that the controller 66 can indicate to the actuator 65 which direction to move head 62. Servo fields 13 and 15 may, for example, be written at a different frequency, or may contain differing data recognizable by read/write electronics 66, or they may be written in such order as to reflect a pattern, e.g., an alternating or other predictably predetermined pattern. In this manner, a feedback system via servo fields is in place to keep the head 62 in the center of track 14 so that errors in data reading or writing do not occur.

FIG. 5A shows servo fields 13 and 15 positioned in a manner to allow dual usage by adjacent tracks 14. As head 62 travels from one data track 14 to an adjacent data track 14, the directional information sent to actuator 65 from controller 66 changes. Although servo mark 15 in the above description indicated a directional shift of head 62 radially outward, on the adjacent track 14, servo mark 15 will indicate a directional shift of head 62 radially inward. This, however, is one embodiment shown for illustrative purposes of a system for reading and writing data tracks 14 on medium 10 utilizing servo fields. Servo fields 13 and 15 need not operate for two adjacent tracks. Servo fields can be placed anywhere on a medium, in a continuous or discontinuous manner, so that a head 62 can detect a deviation from data tracks 14.

In accordance with the present invention, the format of the medium 10 of FIG. 5A may be supplemented by providing offset graycodes 300 and hard indices, as previously described.

FIG. 5C represents another prototypical example of a recording medium 10; however, there are many different formats that can be used with the present invention, and the format is shown for purposes of illustrating the existence of alternate non-limiting formatting of a recording medium 10. In the examplary format or pattern illustrated, recording medium 10 has an outside zone 210 and an inside zone 211, separated by radial division 212. Inside zone 210 has 3 sectors of data per revolution and outside zone 210 has 6 sectors of data per revolution. The medium 10 has radial regions 213 for positioning fields containing information concerning sector identity, location, and the like. In addition, servo wedges 214 are regions in which servo fields 214a can be positioned to aid a head in tracking a data path. Data tracks 218, having data regions for the storage of data, are positioned within data wedges 217. Following a positioning field may be a synchronization field 216a and a synchronization mark 216b. Thus, as FIGS. 5A and 5C illustrate, a variety of servo field patterns are possible depending upon a chosen layout or design for a recording medium 10.

In accordance with the present invention, the format of the medium 10 of FIG. 5C may be supplemented by providing offset graycodes 300 and hard indices, as previously described.

Additionally, any method for forming servo fields is contemplated in accordance with the present invention. As appreciated by one of ordinary skill in the art, there are also a variety of techniques for forming servo fields. Servo writing for a magnetic type storage medium may be implemented with what is known to those of ordinary skill in the art as a servo writer. For example, commonly assigned U.S. Pat. No. 5,917,669 describes a servo-writing process by a servo writer in exemplary detail in connection with a magnetic type storage medium.

However, the present invention may also apply to optical media. In more recent times, a variety of optical servo techniques have evolved in connection with optical media. For example, commonly assigned copending U.S. patent appln. Ser. No. 09/613,936, filed Jul. 11, 2000, entitled "Optical Servo Writing," describes a novel process of optical servo writing.

Conventional far-field optical data storage and tracking methods have predominantly used the continuous composite servo (CCS) approach. CCS is an analog method in which continuous tracking data is extracted from information concerning light diffracted from grooves positioned in relation to the tracks. In a continuous feedback fashion, data from the light diffracted by the grooves indicates to a control circuit where the tracking head should move in order to read the track most effectively.

Another conventional method used in optical systems is the sampled-servo method. In this method, embossed pits are positioned into the surface of the optical medium in relation to the center of data tracks also for the purpose of providing tracking information. As the read/write head reads data, it also passes over the areas where the embossed pits have been positioned. If a signal is received by a servo controller corresponding to these servo fields, then the servo controller directs the head back to the center of the track. By encoding the servo fields differently than the data along the tracks, e.g., by encoding the servo fields with different frequency information than the data track, the read/write head not only can read data, but also can reveal information to the controller about its position with respect to the servo fields. In this fashion, tracking may be accomplished even in a near-field optical system.

Due to new capabilities and advances in the field, the tracks on a storage medium are being placed closer and closer together. Thus, more recent approaches to high density optical recording have employed near-field methods and other methods tending to reduce the spot size of a laser beam to decrease the width of tracks on an optical medium in the radial direction.

The ability to produce servo fields that correspond exactly to the optical property exploited for signal detection is also advantageous. By example, magneto-optical drives detect data by sensing the rotation of polarization due to the Kerr effect. Detection of servo fields is accomplished by detecting the difference in reflectivity from the disk due to the destructive interference caused by a pit written to be one-quarter of a wavelength in depth. The drive therefore must switch between two detection modes when transitioning from data to sector areas.

In contrast, for phase-change recording, a short (less than 100 ns) burst of laser light converts a tiny spot on the medium's highly reflective crystalline surface to the less reflective amorphous, or semicrystalline state, the conversion occurring upon rapidly heating the material to a temperature above its melting point, then rapidly quenching it, "freezing" it into the amorphous state. Restoring the storage medium to its original state is done by heating the bit locations to a temperature below the material's melting point, but for an "extended" period of time (on the order of $10^{-5}$ s).

With the invention of commonly assigned copending U.S. patent appln. Ser. No. 09/613,936, it was recognized that a servo mark or spot on a medium's crystalline surface can be "permanently" or irreversibly written via optical means. For example, "Laser-Induced Multiple Phase Transitions in Ge-Te Films Traced by Time-Resolved TEM," by O. Bostanjoglo and P. Thomsen-Schmidt, Applied Surface Science, Elsevier Science Publishers, pp. 136–141 (1989), illustrates that several different phase structures may be generated for at least one phase changed media composition. In a relevant portion, the article states that complex multiple phase transitions were found by time resolved (TEM) to proceed in laser pulse-annealed Ge-rich GeTE films.

Additionally, "Progress of Erasable Phase-Change Materials," by M. Chen and K. A. Rubi, S. P. I. E. Vol. 1078—Optical Data Storage Topical Meeting, pp. 150–156 (1989), discusses both a metastable and stable crystalline phase for certain optical storage media. The article states that the activation energy barrier between the metastable and the stable crystals is usually very high, and data stability at ambient temperatures is not expected to be a problem. For further background, Progress of Phase-Change Single-Beam Overwrite Technology," by Trao et al., S. P. I. E. Vol. 1078—Optical Data Storage Topical Meeting, pp. 2–10 (1989), explains the process and characteristics of graying of the media, such that the gray portions or graycodes can not be reversibly changed back to the crystalline state. The article discusses that the diffusion length of atoms in optical media may be altered (longer diffusion lengths) for the amorphous state so that the transition to the crystalline state correspondingly becomes longer. This diffusion length alteration may be effected, for example, with multiple overwrites and/or increased amorphization heating periods.

Hence, as the above clarifies, in connection with magnetic data storage media and optical media, there are a variety of methods and techniques for generating servo fields as well as a variety of locations on a recording medium at which servo fields may be formed in connection with a feedback system for positioning an actuator head. There are additionally a variety of servo field patterns, such as the patterns illustrated in exemplary FIGS. 5A and 5C, whereby knowledge of the servo field pattern aids in the positioning of the actuator head according to feedback positioning techniques. The present invention may apply to any of the above-described scenarios.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, DVD-ROMs, ROMs, PROMs, EPROMS, EEPROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention. For example, the storage techniques used in connection with the present invention may invariably be a combination of hardware and software.

While the present invention has been described in connection with the preferred embodiments of the various Figures, it is to be understood that other similar embodiments may be used or modifications and additions may be made to the described embodiment for performing the same function of the present invention without deviating therefrom.

Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims. Thus, the scope of the present invention is to be construed to encompass a variety of recording medium formats, and a variety of formatting techniques, including techniques and formats in connection that embody headerless formats.

What is claimed is:

1. A method for formatting a data storage medium, comprising:
    writing using at least one servo mark on the data storage medium with a servo mark writing device;
    writing at least one hard index on the data storage medium with said servo mark writing device;
    writing at least one code mark on the data storage medium with said servo mark writing device, wherein said at least one code mark is offset from said at least one hard index by an offset distance selected from one of a plurality of pre-defined offset distances.

2. A method according to claim 1, wherein said data storage medium is a magnetic type storage medium, said at least one code mark is at least one graycode mark and said servo writing device is a servowriter.

3. A method according to claim 1, wherein said data storage medium is an optical storage medium, said at least one code mark possesses the characteristics of an optical servo mark and said servo writing device is an optical servo mark writing device.

4. A method according to claim 1, wherein said offset distance of the plurality of pre-defined offset distances is assigned randomly.

5. A method according to claim 1, wherein said offset distance of the plurality of pre-defined offset distances is assigned according to a pre-determined selection.

6. A method according to claim 1, wherein each of said at least one code marks includes a plurality of bits of identification information.

7. A method according to claim 6, wherein said plurality of bits of identification information are assigned according to a pre-determined selection by one of (1) said servo mark writing device and (2) a device that provides pre-selected number to said servo mark writing device.

8. A method according to claim 6, wherein said plurality of bits of identification information are randomly assigned by one of (1) said servo mark writing device and (2) a device that provides a random number to said servo mark writing device.

9. A method according to claim 6, whereby the combination of (1) the value contained in the plurality of bits of said at least one code mark and (2) the amount of offset of said at least one code mark from said at least one hard index provide unique information readable by a data storage device that reads from said data storage medium.

10. A method according to claim 9, wherein said unique information is output to a digital rights management system.

11. A method according to claim 9, whereby said data storage device reads from said data storage medium at a frequency different from the frequency used by said servo mark writing device and said data storage device is unable to write at the frequency used by said servo mark writing device.

12. A method according to claim 1, wherein said writing of said at least one hard index is performed at a different frequency than the frequency used for said writing of said at least one servo mark field.

13. A computer readable medium comprising computer executable instructions for instructing said servo mark writing device to perform the method of claim 1.

14. A computing device comprising means for performing the method of claim 1.

15. A method for reading unique information from a storage medium with a data storage device during a read operation of said data storage device, comprising:
    first identifying of a hard index field on said data storage medium;
    second identifying of a code mark on said data storage medium;
    first determining of an offset distance of said code mark from said hard index field;
    second determining of a value contained in said code mark; and
    combining said offset distance information with said value information, whereby the result of said combining is said unique information.

16. A method according to claim 15, wherein said hard index and said code mark are written to the data storage medium with a servowriter and are unalterable by said data storage device.

17. A method according to claim 15, wherein said unique information is output to a digital rights management system.

18. A method according to claim 15, wherein said data storage medium is a magnetic type storage medium and said at least one code mark is at least one graycode mark.

19. A method according to claim 15, wherein said data storage medium is an optical storage medium and said at least one code mark possesses the characteristics of an optical servo mark.

20. A method according to claim 15, wherein said offset distance is one of a plurality of pre-defined offset distances.

21. A method according to claim 15, wherein said code mark includes a plurality of bits of identification information.

22. A computer readable medium comprising computer executable instructions for instructing said data storage device to perform the method of claim 15.

23. A computing device comprising means for performing the method of claim 15.

* * * * *